United States Patent [19]

Alizadeh

[11] Patent Number: 5,771,961
[45] Date of Patent: Jun. 30, 1998

[54] FAN MODULE

[75] Inventor: Ahmad Alizadeh, Indianapolis, Ind.

[73] Assignee: Valeo Thermique Moteur, Le Mesnil St. Denis, France

[21] Appl. No.: 511,037

[22] Filed: Aug. 3, 1995

[51] Int. Cl.⁶ .................................................. F28F 13/12
[52] U.S. Cl. ........................... 165/121; 165/140; 165/41; 180/68.4; 416/195
[58] Field of Search .................................... 165/121, 122, 165/67, 41; 180/68.4, 68.1; 416/194, 195

[56] References Cited

U.S. PATENT DOCUMENTS

| | | | |
|---|---|---|---|
| 1,612,110 | 12/1926 | Funger | 416/194 |
| 2,738,957 | 3/1956 | Wales | 165/121 X |
| 3,061,277 | 10/1962 | Anderson | 165/121 X |
| 3,275,071 | 9/1966 | Kritzer | 165/151 |
| 4,210,833 | 7/1980 | Neveux | 310/58 |
| 4,351,162 | 9/1982 | Yee | 62/239 |
| 4,510,991 | 4/1985 | Kawahira | 165/41 |
| 4,979,584 | 12/1990 | Charles | 180/68.1 |
| 5,097,891 | 3/1992 | Christensen | 165/41 |
| 5,269,367 | 12/1993 | Susa et al. | 165/41 |

*Primary Examiner*—Allen J. Flanigan
*Attorney, Agent, or Firm*—Morgan & Finnegan, LLP

[57] ABSTRACT

A fan for an automotive radiator has a hub with a group of blades extending radially outwardly from the hub. A support member joins together the outward extensions of the blades in the first group. A second group of blades extend radially outwardly from the support member and a second support member joins together the ends of the blades in the second group.

31 Claims, 10 Drawing Sheets

FAN MODULE

FIELD OF THE INVENTION

The present invention relates to a cooling apparatus and more specifically but not exclusively to such apparatus for cooling heat engines used in particular in automobile vehicles. More precisely, it proposes a new arrangement of the motor fan group relative to two heat exchangers such as the radiator and the condenser.

BACKGROUND OF THE INVENTION

Under the bonnet of the vehicle the space available to house the cooling apparatus is increasingly often limited. The concern with finding more space is always present and the modules must be adapted to new constraints of size limitation. In addition to this desire to save space there must now be added the attempt to reduce the weight and cost of the module.

Nowadays, the complete cooling module equipping many vehicles comprises a radiator, a condenser, a fan, a motor and a shroud. This shroud has a double function. On the one hand it ensures better guidance of the air across the exchangers and, on the other hand, it enables the fan ventilator group to be fixed and held. However, it forms too large a fraction of the volume relative to the total volume of the module. Equally it makes a significant contribution to the total weight and cost of the module.

DISCLOSURE OF THE INVENTION

One aim of the present invention is to provide a cooling apparatus so as not to comprise a shroud but at the same time without in any way decreasing the fan performance. In one embodiment the fan is mounted between the condenser and the radiator, the motor being mounted directly on the condenser. In this manner a great reduction in the weight, the cost and the size of the module may be achieved.

According to a first aspect of the present invention there is provided a cooling module comprising a radiator, a condenser, a motor, a fan and a non-rotating ring extending about the fan periphery, wherein the fan is situated between the condenser and the radiator.

Preferably the condenser consists of plural condenser tubes and the motor shaft passes between the condenser tubes via a through hole.

Advantageously the ring is secured to the radiator.

Conveniently the motor is directly mounted on the condenser.

Advantageously the radiator and condenser are secured to one another by fixing pads.

According to a second aspect of the present invention there is provided a cooling module comprising a radiator, a condenser, two motors, two fans and two non rotating rings each extending about the periphery of a respective fan wherein the two fans are mounted between the condenser and the radiator.

Conveniently each motor has a respective shaft, has the two motor shafts pass between the tubes of the condenser bundle through two through holes.

Advantageously the two rings are secured to the radiator.

Conveniently the motors are directly mounted on the condenser.

Advantageously the radiator and condenser are fixed to one another by fixing pads.

According to a third aspect of the present invention there is provided a cooling apparatus comprising a first heat exchanger and a second heat exchanger, the two heat exchangers being disposed such that each has at least a portion in face-to-face relationship with the other, the apparatus further comprising a fan and a ring member circumferentially enclosing the periphery of the fan, the ring member being secured to at least one of the two heat exchangers and the fan being disposed between the facing portions of the heat exchangers.

According to a fourth aspect of the present invention there is provided a cooling apparatus comprising a first heat exchanger and a second heat exchanger, the two heat exchangers being disposed such that each has at least a portion in face-to-face relationship with the other, the arrangement further comprising a plurality of fans and a corresponding plurality of ring members, each ring member circumferentially enclosing the periphery of a respective one of the fans, the ring members being secured to at least one of the two heat exchangers and the fans being disposed between facing portions to the heat exchangers.

Preferably the first heat exchanger is a radiator and the second heat exchanger is a condenser.

Advantageously the apparatus further comprises a fan drive motor for driving the fan, and the fan drive motor is directly mounted on one of the first and second heat exchangers.

Conveniently the first and second heat exchanger are secured to one another.

Preferably, each fan comprises a hub portion having secured thereto a first plurality of first blades extending therefrom radially outwardly to a first circumferentially-extending blade support member, and a second plurality of second blades extending radially outwardly from the first support member.

Advantageously an auxiliary fan is disposed on the outer face portion of one of the first and second heat exchangers.

Conveniently the apparatus further comprises an electric motor rotating the fan, the electric motor having a shaft member, one of the heat exchangers defining a passageway for the shaft member and the shaft member extending to the space between the two heat exchangers whereby the fan is secured to the shaft member.

Advantageously the electric motor is a brushless d.c. motor.

BRIEF DESCRIPTION OF THE DRAWINGS

The present invention will now be described with respect to the accompanying drawings in which.

In the drawings like reference numerals indicate like parts.

DESCRIPTION OF THE PREFERRED EMBODIMENTS

Figure 1:
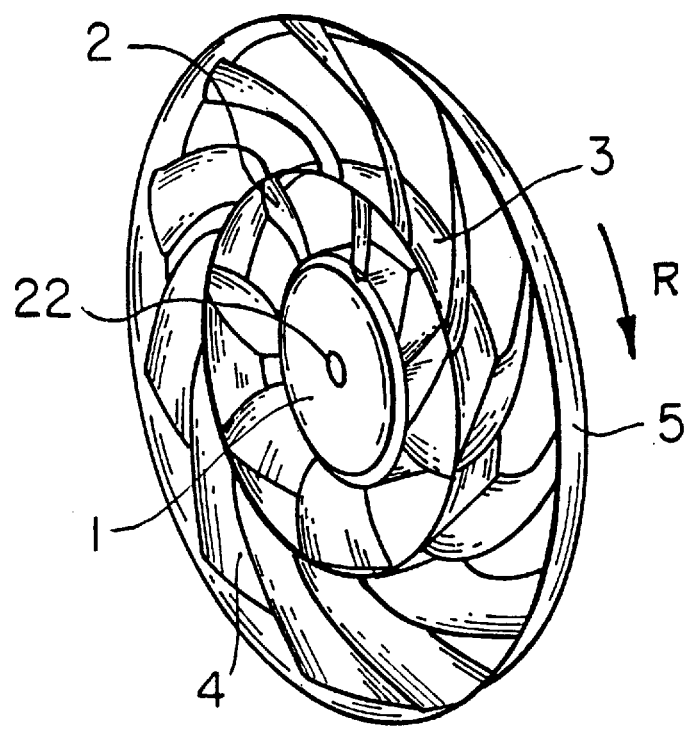
FIG. 1 shows an isometric view of an axial flow fan suitable for use with the present invention.

Referring to FIG. 1, an axial flow fan has a hub member (1) having an external periphery which supports a first plurality of radially-extending first blades (2). At the tip region of the first blades, the first blades are connected together by a first circumferentially-extending blade support member (3) which also forms a root-support member for a second plurality of second blades (4) are, in turn, supported at their tip regions by a second blade-tip support member (5) which is disposed concentrically with the fan axis and the first blade tip support member (3).

The hub member (1) has a generally planar front face portion and a centrally-disposed aperture (22) for a fan drive shaft.

Where acoustic considerations are important, it has been found advantageous to provide a prime number of first blades and a different prime number of second blades. It has also been found desirable, although not essential, to ensure that the first and second blades do not coincide at the blade tip support member.

The above-described fan has a reduced axial extent. At the same time, this fan has good air-moving properties because it provides air moving ability over a large proportion of the fan radial extent. It will be realised that these features make the fan described with respect to FIG. 1 useful in the context of the present invention.

In the present embodiment, a major feature is the positioning of the fan between two heat exchangers, such as a condenser and a radiator. A consequence of this arrangement is the ability to eliminate the shroud and this results in a large reduction in the space utilised beneath the bonnet of an associated vehicle and also a reduction in the weight and cost of the cooling apparatus.

Figure 2:
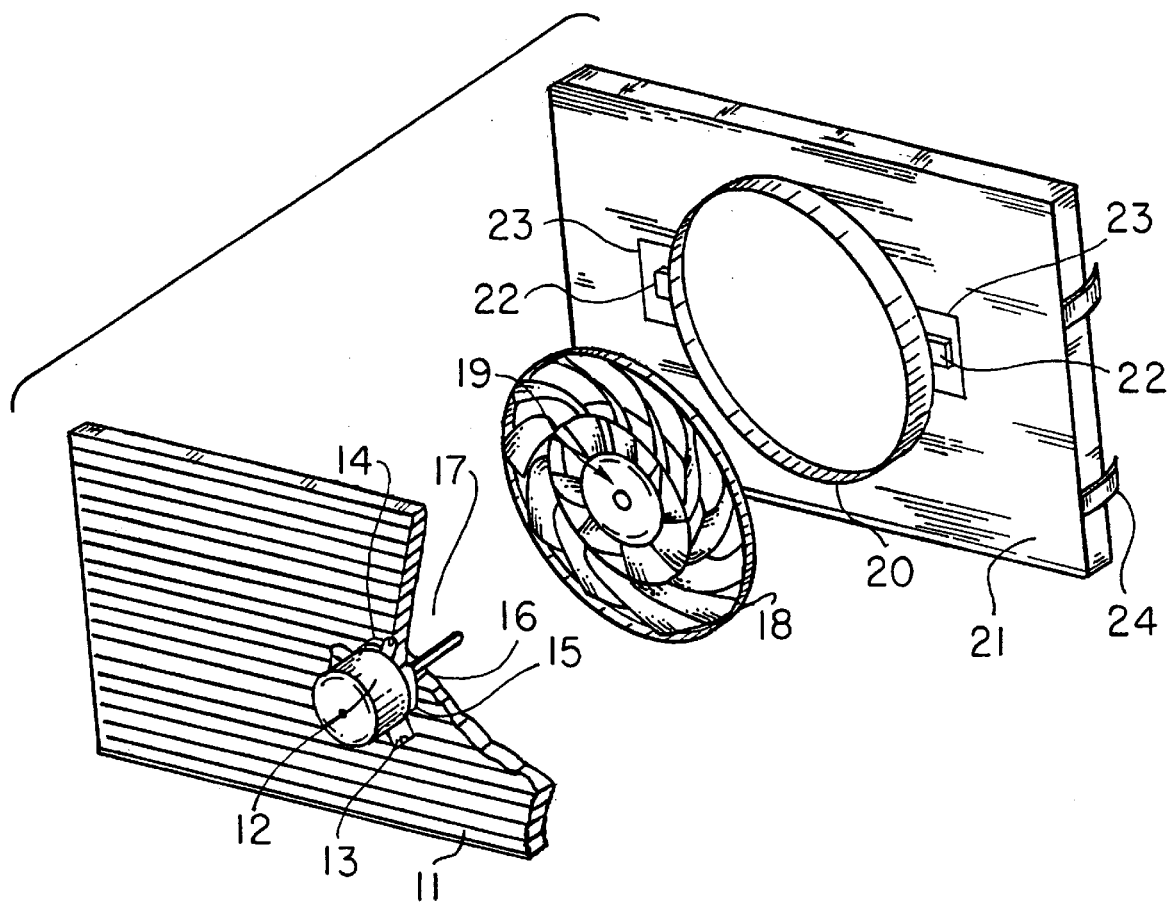
FIG. 2 shows a first embodiment of a cooling apparatus in accordance with the present invention, showing an axial flow fan disposed between a condenser and a radiator, a non-rotating ring being secured to the radiator.

Referring to FIG. 2, a motor (12) is secured to a condenser (11). The motor has three fixing pads (13) in the region of a front motor flange (14). Three counterpart fixing pads (15) are brazed to the front face of the condenser. A hole (16) is provided through the condenser between the tubes, for example through condenser pins, to allow the motor shaft (17) to pass through. After the motor shaft (17) has been passed through the hole (16) in the condenser, the motor is secured to the condenser by fixing pads (13) and (15). A fan (18) has an insert (19) in its centre and the shaft is fixed in this insert. A fixed ring (20) is secured to the front face of a radiator (21). This fixed ring has two fixing lugs (22) which are riveted to two further fixing lugs (23) of the radiator. The radiator and condenser are secured to one another indirectly by means of four fixing lugs (24).

An alternative embodiment where the ring (20) is secured to the condenser instead of being fixed to the radiator is also envisaged.

This latter embodiment is advantageous for the following reasons:

The whole module, whilst it is operating, is subjected to severe jolts and vibrations. But the distance between the rotating ring of the fan and the fixed ring is very small, allowing only a very restricted relative movement of these two components. In known arrangements, the fact that the fixed ring and the fan are mounted on two different supports namely the radiator and condenser increases the relative movement of one of these components with respect to the other because the supports are themselves subject to movement relative to one another. To overcome this problem, the fixed ring is secured to the condenser. In this way the fan and the ring are mounted on the same support and this decreases the risk of these components touching when the module is subjected to powerful vibrations.

Figure 3:
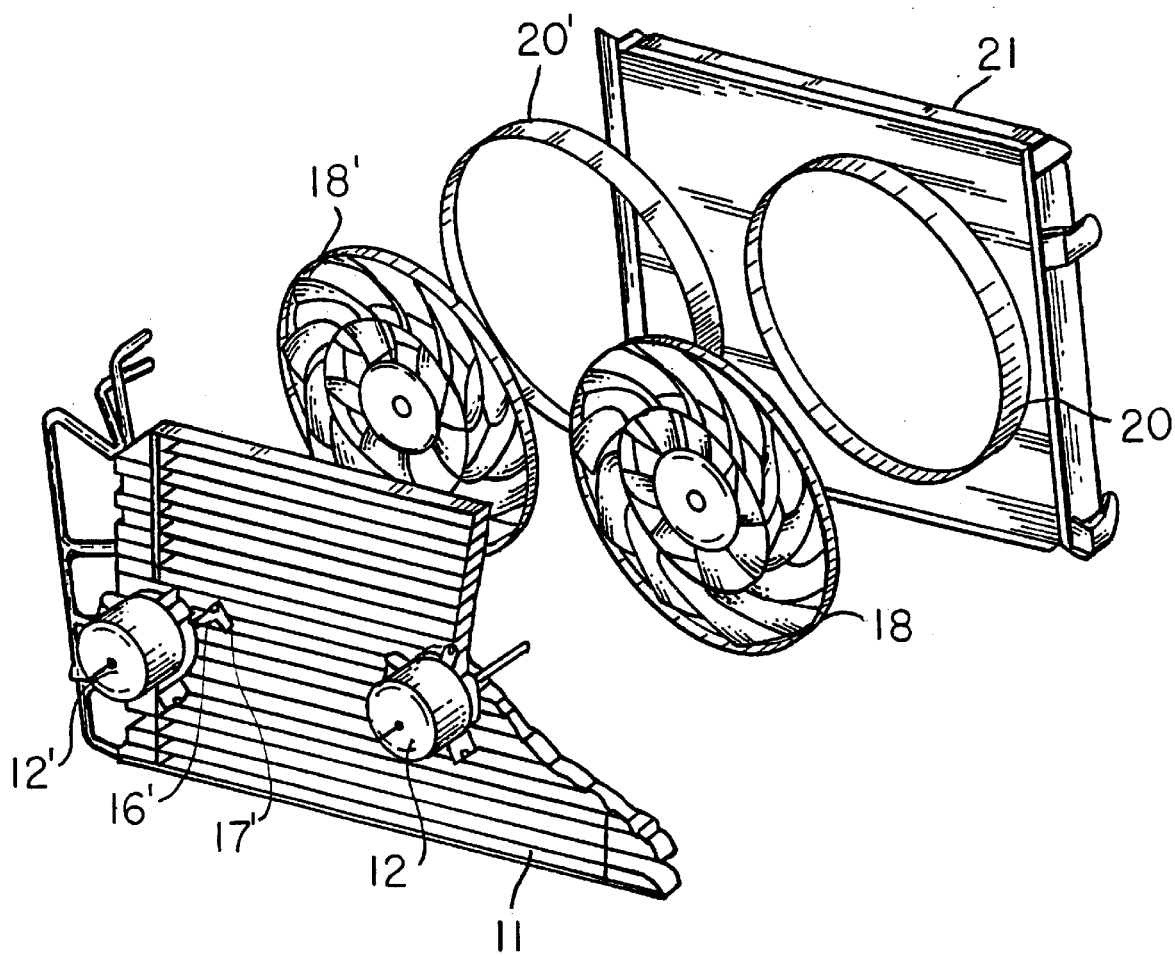
FIG. 3 shows a cooling apparatus similar to that of FIG. 2, but having two fans disposed side by side between the condenser and radiator.

The embodiment which have just been described relate to the case where the module comprises only one motor and consequently only one fan. In an alternative embodiment, the module comprises two motors and two fans, the principle being otherwise similar—see FIG. 3.

The motors (12,12') have three (or four) fixing pads and are fixed directly on the front (in relation to the direction of the air flow) face of the condenser (11). Two holes (16,16') are provided between the tubes of the condenser, eg through fins of the condensor. The two motor shafts (17,17') pass through the condenser through the two holes (14) and (15). The two fans (18, 18') are fixed on the two motor shafts indirectly by means of two inserts mounted at the centre of the fans. Two fan-rotating rings (20,20') are fixed on the front face of the radiator (21).

The main rings may be secured to the condenser instead of to the radiator.

It is possible that in some cases a fan disposed between the radiator and the condenser is not sufficient to produce the desired air flow. It is then possible to site a further fan and a further motor to provide additional flow, the further fan being in front of the condenser rather than between the heat exchangers. So far as the first fan is concerned, this is always mounted in the "fan-between" configuration, whereby the first fan is located between the two exchangers. In contrast, the second or further fan is a so-called pusher fan and is located in front of the condenser upstream in the flow of air.

Figure 4:
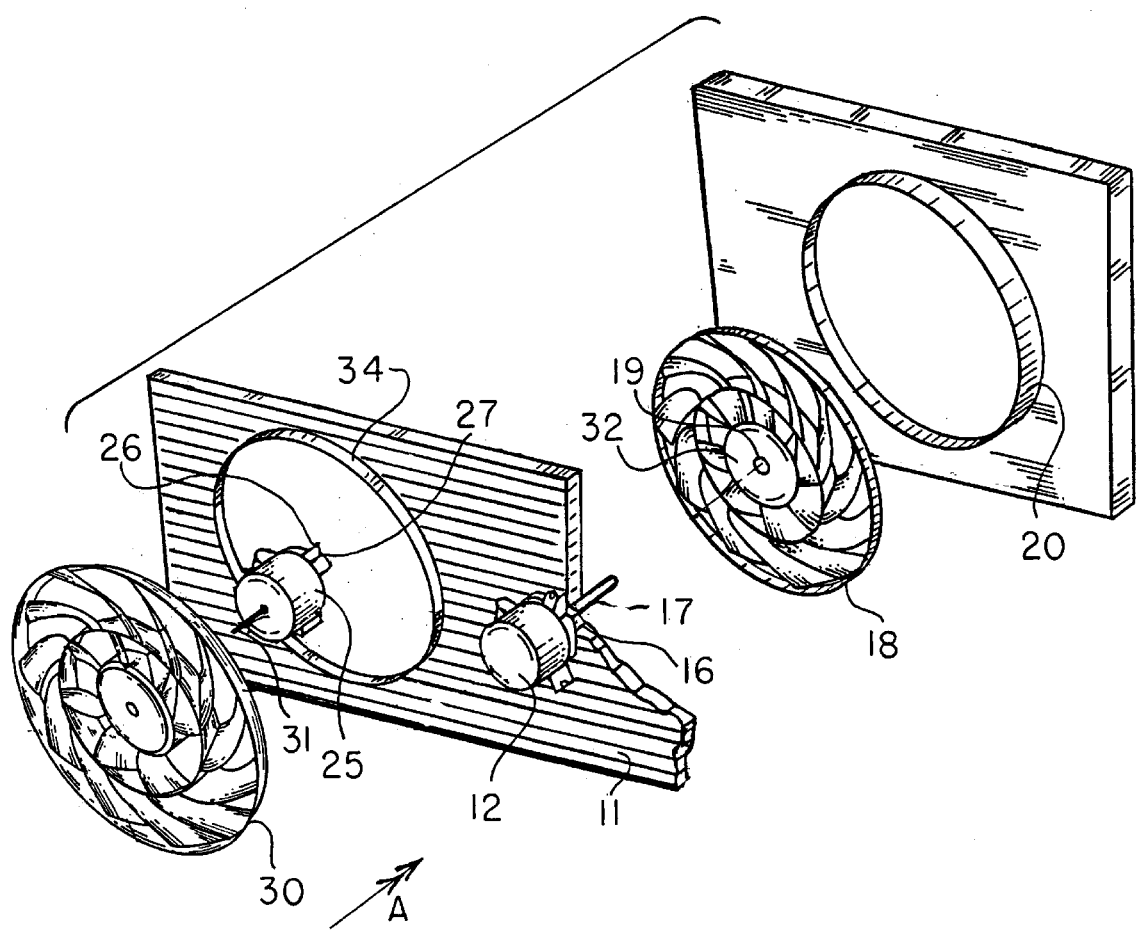
FIG. 4 shows a cooling apparatus having the fan disposed between a condenser and a radiator, with an auxiliary fan disposed on the outer face of the condenser.
Figure 5:
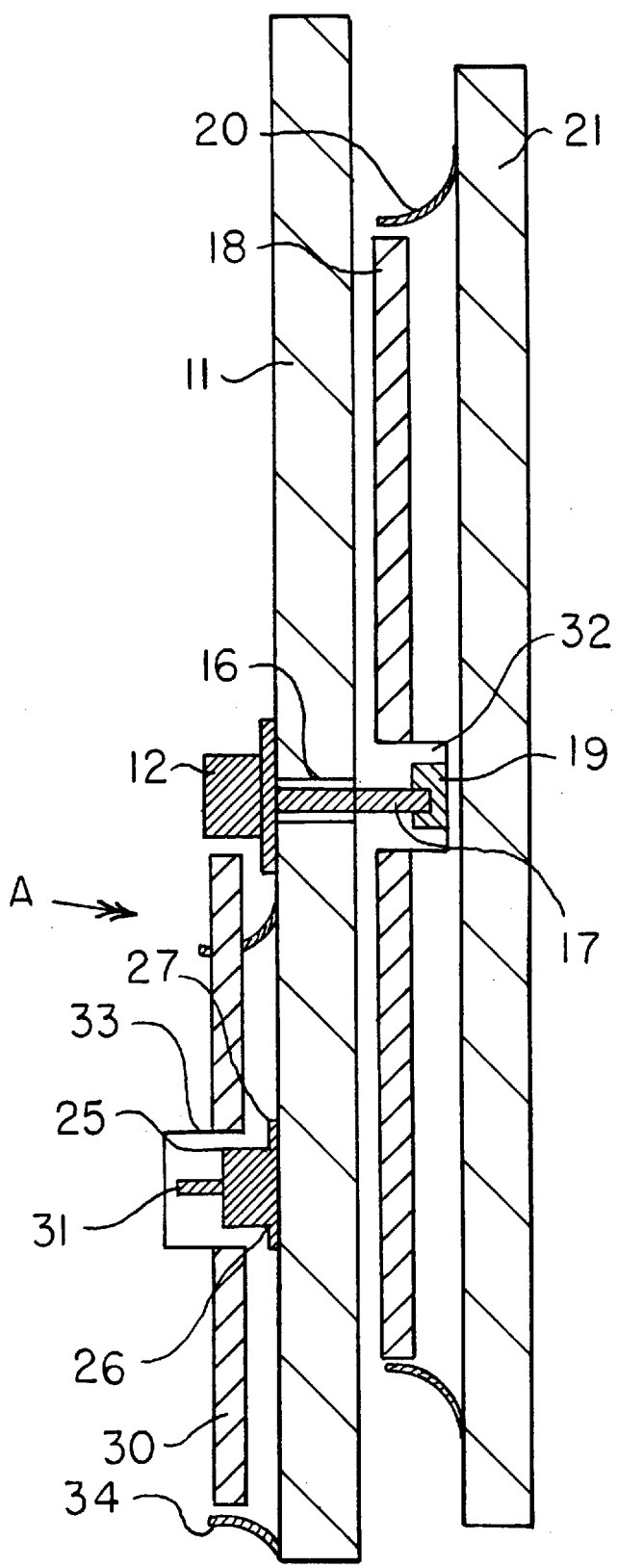
FIG. 5 shows a transverse cross-section through the arrangement of FIG. 4.

The mounting of the first and further fans to the two heat exchangers will now be described with reference to FIGS. 4 and 5.

A principal motor (12) for the first fan (18) is mounted on the condenser (11) at the centre of the latter. A hole (16) is provided, in the centre, through the condenser body, between two pipes of the latter. The motor shaft (17) passes through the condenser through this hole and is fixed to the first fan (18) by an insert (19) located at the centre of the hub (32) of the fan. A fixed ring (20) is mounted on the radiator (21). To secure the ring to the radiator, two fixing lugs may be used which make it possible to screw the collar to the radiator. A second motor (25) is mounted on the front face (in relation to the air flow direction A) of the condenser. This second motor comprises three motor fixing lugs (26) in the region of a rear flange (27). The three motor fixing lugs, together with three fixing lugs brazed on the condenser, make it possible to fix the motor on the front face of the condenser. A second fan (30) is mounted on a shaft (31) of the second motor. Then, because in this configuration the relative position of the motor is reversed, the hub (33) of the auxiliary fan is also reversed. To avoid the blades of the second fan (30) being spaced too far from the condenser, the axial length of the hub (33) is increased so as to bring the fan blades close to the condenser. A second ring (34) is secured to the front face of the condenser thus enabling better guidance of the air flow which the auxiliary fan generates.

This arrangement is especially suitable for low or medium power auxiliary motors (from about 100 to 200 watts).

It is also envisaged to secure the principal ring to the condenser instead of to the radiator.

A further embodiment provides a second motor and fan secured to the radiator. This is useful where a fan disposed between the two heat exchangers does not by itself provide a sufficient flow rate for satisfactory cooling. In this configuration the fan is a puller fan and is positioned on the rear face of the radiator (in relation to the air flow).

Figure 6:
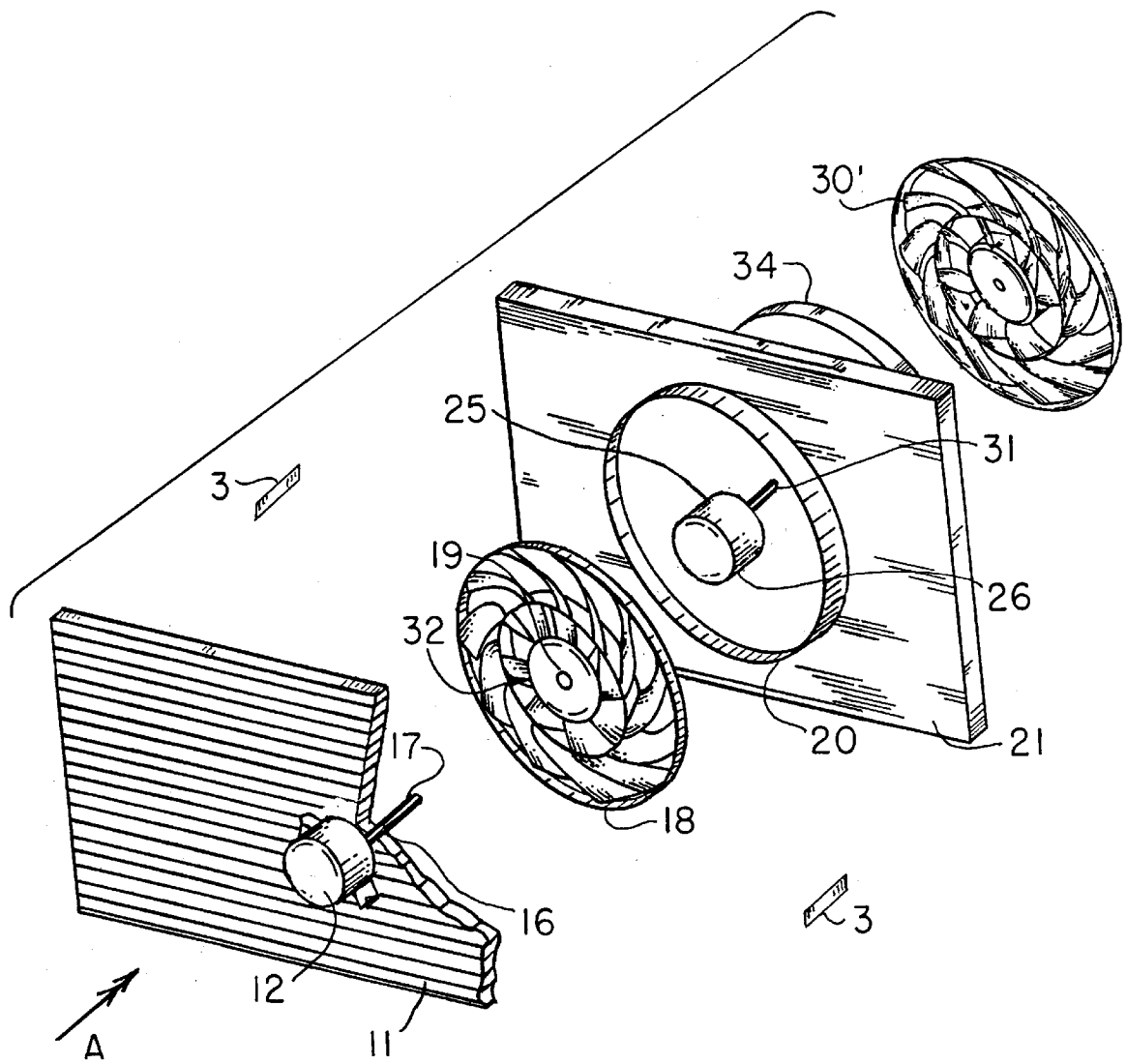
FIG. 6 shows an arrangement similar to FIG. 4, but with the auxiliary fan secured to the outer face of the radiator.
Figure 7:
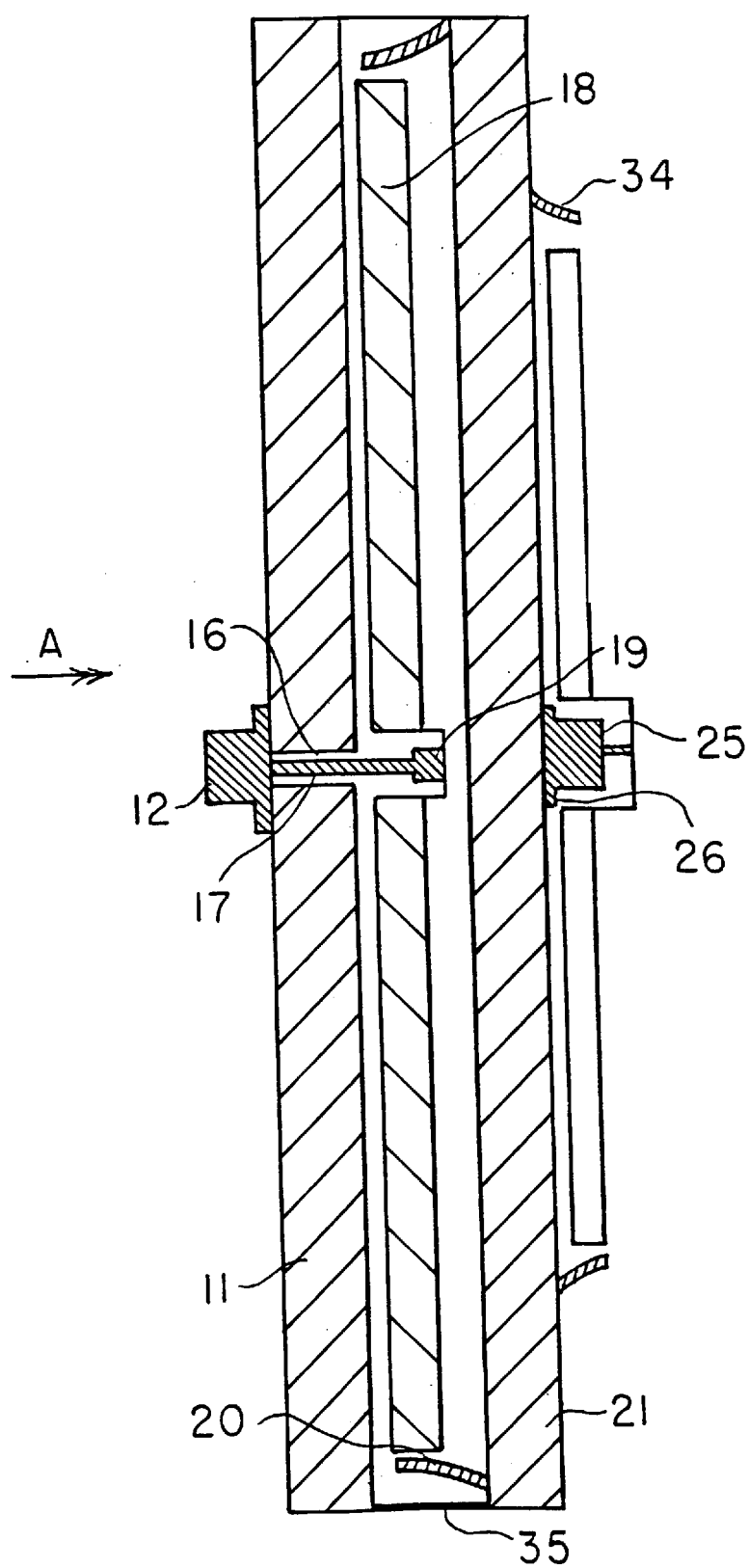
FIG. 7 shows a transverse cross-section through the arrangement of FIG. 6.

Referring to FIGS. 6 and 7, a first motor (12) is mounted on a condenser (11) at the centre of the latter. A hole (16) is provided, in the centre, through the condenser body, between two pipes of the latter. A motor shaft (17) passes through the condenser through this hole and is fixed to a first fan (18) via an insert (19) located at the centre of the hub of the first fan. A ring (20) is mounted on a radiator (21). To fix the ring, two fixing lugs are used which make it possible to screw the ring to the radiator. A second auxiliary motor (25) is mounted on the rear (with respect to the airflow direction A) face of the radiator, the rear flange of the motor being attached to the latter. Three motor fixing lugs (26) make it possible to fix the motor on the radiator. On the shaft (31) of the auxiliary motor (25), there is mounted an auxiliary fan (30'). For better guidance of the air, a ring (34) is mounted on the rear face of the radiator. The ring comprises two fixing lugs enabling it to be screwed directly to the radiator. Fixing lugs (35) enable the radiator and condenser to be secured together.

It should be noted that this arrangement is especially suitable for low power auxiliary motors (from about 60 to 120 watts).

It is also envisaged to secure the main ring to the condenser instead to the readiator.

In all of the above-described embodiments the fan motor for the or each fan disposed between the two heat exchanger has a shaft which passes through an aperture through one of the heat exchangers. It will be clear to one skilled in the art that modifications to this arrangement are possible. For example, where sufficient space were available, it would be possible to dispose the motor itself between the two heat exchangers and secure the shaft of the motor to the fan.

An especially advantageous arrangement will be provided in which the or each drive motor is an electronically-commutated, or d.c. brushless motor. In the above-described embodiments, namely where the shaft passes through one of the heat exchangers, the use of a d.c. brushless motor will allow for better control of the fan rotation speed. However, if such a d.c. brushless motor were secured between the two heat exchangers, an especially space-saving apparatus could be provided.

Figure 8:
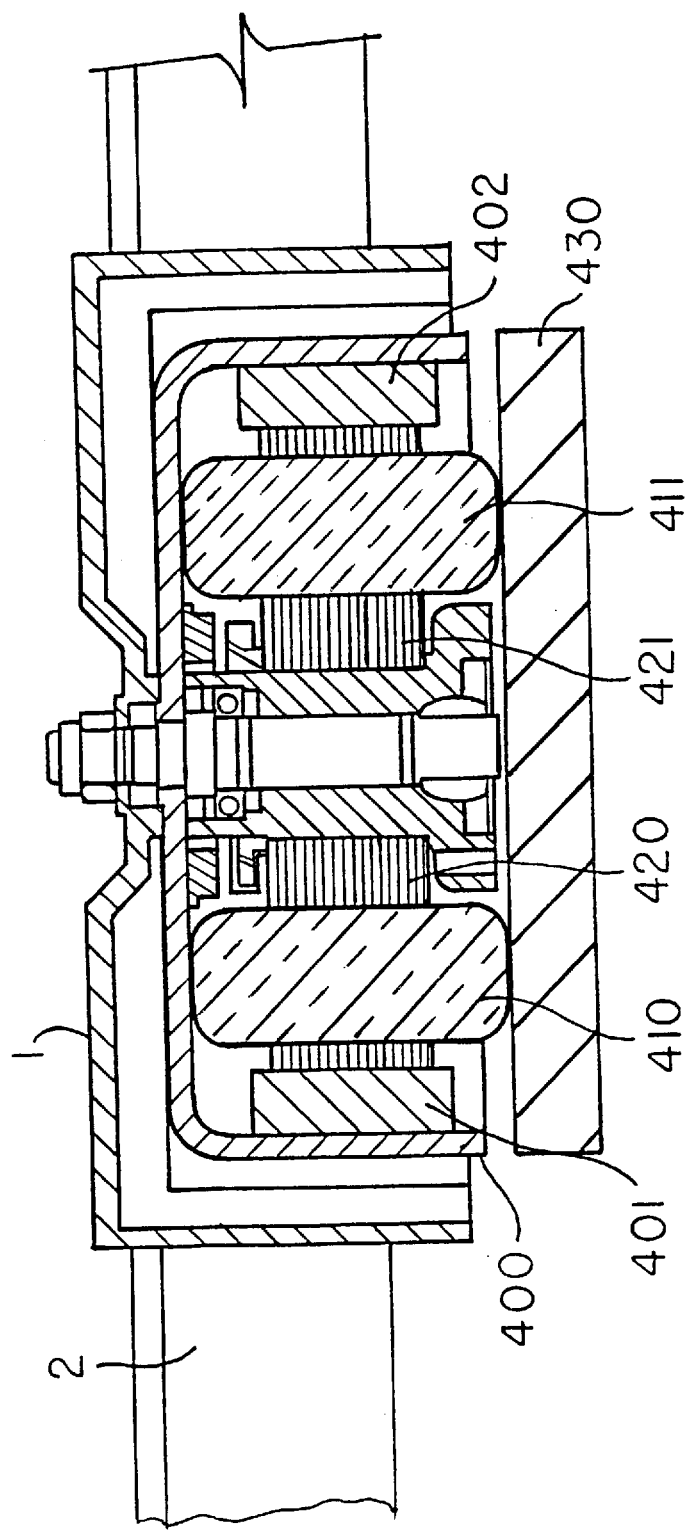
FIG. 8 shows an axial cross section through a fan of the invention showing an integral electric motor.
Figure 9:
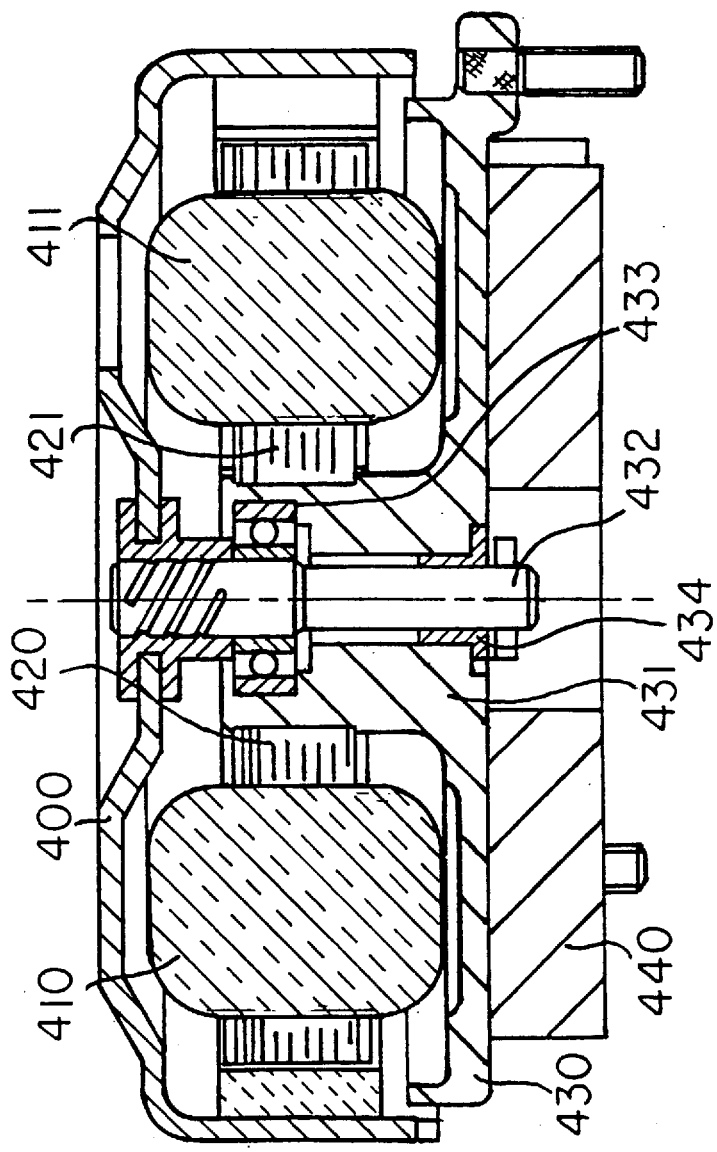
FIG. 9 shows a more detailed view of the construction of the motor of FIG. 8.

An electronically-commutated or brushless d.c. motor may be embodied as a switched-reluctance motor, but, in a more preferred embodiment, the motor is a permanent magnet brushless motor. Referring to FIG. 8, an embodiment is shown in which the fan hub (1) has an internal cup-shaped member (400) which carries permanent magnets (401,402). The cup-shaped member (400) which may be integrally formed with the hub, thus providing improved packing density, forms the rotor of an electronically-commutated motor. The motor further consists of a stator which has core members (410,411) each carrying a respective coil (420,421). The core members and the cores are secured to a base plate which is then secured to a corresponding face portion of the condenser. The base plate (430) may include the necessary electronic commutating circuitry for switching a direct current supply sequentially to the coils (420,421) to create a rotating magnetic field, thus applying torque to the cup-shaped rotor member (400) for rotating the fan hub (1) and hence the blades. The rotating field may be controlled depending on the position of the rotor, to ensure synchronism between the stator and rotor fields. FIG. 9 shows a more detailed construction of the rotor and stator described above. Referring to FIG. 9, it will be seen that the base plate member (430) has a central boss portion (431) which extends axially of the associated fan, and which supports a shaft member (432) via first and second bearings (433,434). The first bearing (433) is a ball bearing and the second bearing (434) is a sleeve bearing. In the device of FIG. 9, the base plate member (430) supports a circuit module (440). It will be seen therefore that when the fan and base plate are mounted to a face portion of a heat exchanger, the circuit module (440) will be on the same side of the heat exchanger as the fan.

Figure 10:
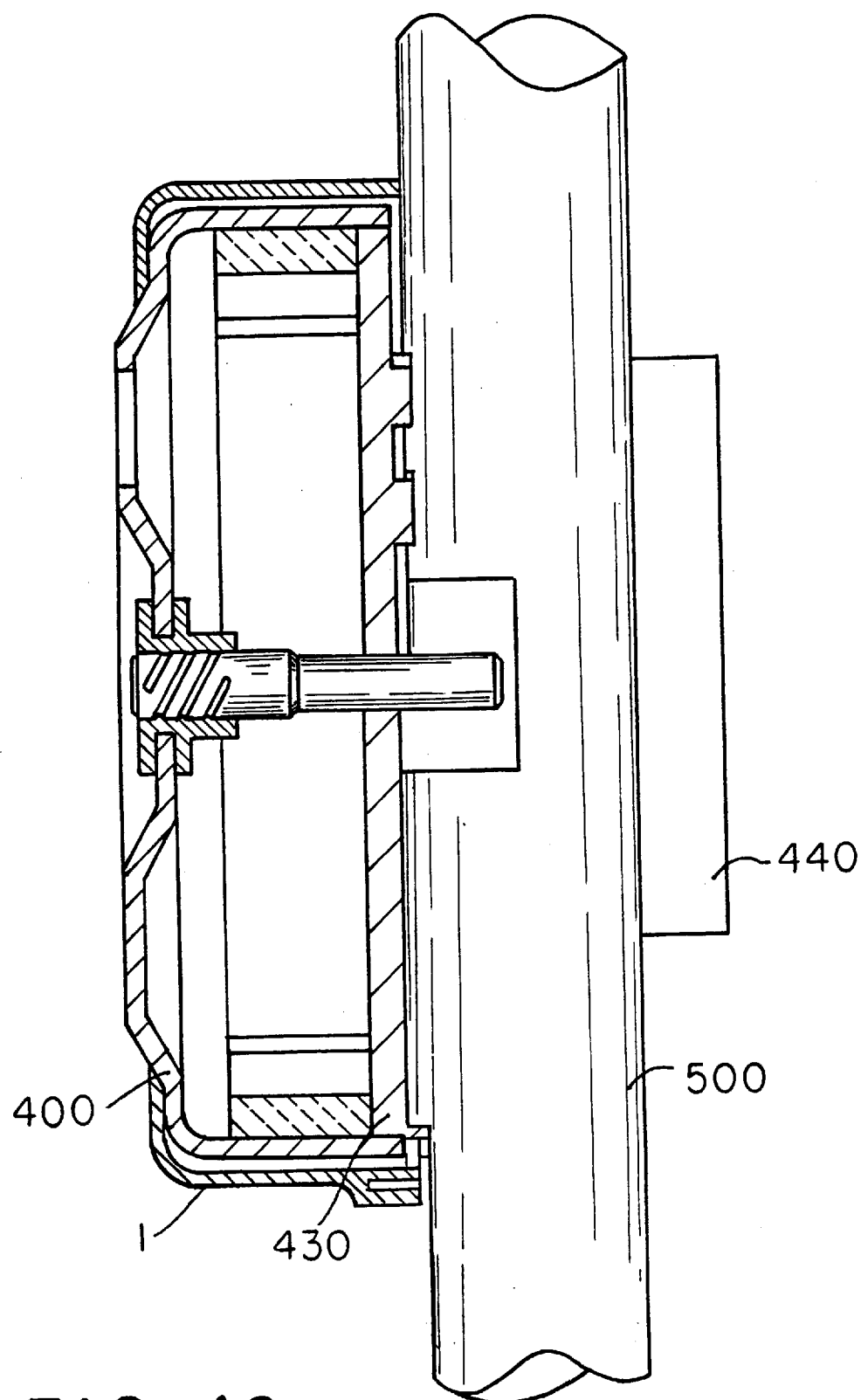
FIG. 10 shows a motor having remote commutating circuitry.

An alternative arrangement is show in in FIG. 10. Referring to FIG. 10, a heat exchanger (500 supports a base plate (430) on one surface thereof, and on the opposing surface there is disposed a circuit module (440). This arrangement is advantageous in a vehicle application where the heat exchanger (500) is a vehicle radiator or the like, and where the circuit module (440) is better cooled by being disposed on the side of the radiator directed towards an incoming air flow. It will of course be realised that the circuit module could instead be located remote from the radiator or other heat exchanger, for example secure to the vehicle body work intself. However this involves complications when mounting the arrangement to provide the necessary paths for the connecting wires.

In the embodiments described with respect to FIGS. 2–7, a fan similar to that described with reference to FIG. 1, has been illustrated. Such a fan, as noted above, is especially advantageous in that it provides a reduced axial extent and at the same time a good air flow performance. It will however be clear to one skilled in the art that other types of fans could be used.

The advantages of the cooling apparatus to the present invention are as follows:

In operation, noise is reduced. This is partly due to the fans being enclosed by the above-described non-rotating ring members, partly due to the absence of support arms which would otherwise be necessary to support a fan drive motor within a shroud in a classical cooling arrangement and partly due to the overall rigidity of disembling which is capable of preventing vibration.

The overall insulation size is considerably reduced with respect to the classical cooling arrangement, in which separate structures are required to support the fan, the condenser and the radiator.

The fan itself is substantially shielded all round, which gives rise to a well-protected fan. It will be clear to one skilled in the art that the fan which is so shielded will be inaccessible to one working under the bonnet of a vehicle, and this will preclude accidents due to entanglement with the rotating fan. Likewise, damage to the fan itself is highly unlikely in this arrangement.

I claim:

1. A cooling module comprising a radiator, a condenser, a motor, a fan and a non-rotating ring extending about the fan periphery, wherein the fan is situated between the condenser and the radiator, a shaft for the motor, the condenser having condenser tubes with a through hole formed between the condenser tubes, the motor shaft having a at least a portion thereof received within the through hole, a hub portion, a first plurality of first blades extending from the hub portion radially outwardly, a first circumferentially-extending blade support member for joining together said outward extension of said first blades, a second plurality of second blades each having a respective end and extending radially outwardly from the first circumferential support member, and a second circumferentially-extending second blade support member joining the ends of said second blades.

2. The cooling module according to claim 1, wherein the ring is secured to the radiator.

3. The cooling module according to claim 1, wherein the ring is secured to the condenser.

4. The cooling module according to claim 1, wherein the motor is directly mounted on the condenser.

5. The cooling module according to claim 1, wherein the radiator and the condenser are secured to one another by fixing pads.

6. A cooling module comprising a radiator, a condenser, two motors, two fans each driven by a respective one of said motors and two non-rotating rings each extending about the periphery of a respective fan wherein the two fans are mounted between the condenser and the radiator, at least one of said fans having a hub for coupling said at least one fan to its respective motor, a first plurality of blades for the at least one fan, a first circumferentially-extending blade support member, said first plurality of blades extending from said hub radially outward to the first circumferentially-extending blade support member, and a second plurality of second blades each having a respective end and extending radially outwardly from the first circumferential support member, and a second circumferentially extending second blade support member joining the ends of said second blades.

7. A cooling module according to claim 6, wherein each motor has a respective shaft, the two motor shafts pass between the condenser tubes through two holes therethrough.

8. The cooling module according to claim 6, wherein the two rings are secured to the radiator.

9. The cooling module according to claim 6, wherein the two rings are secured to the condenser.

10. The cooling module according to claim 6, wherein the motors are directly mounted on the condenser.

11. The cooling module according to claim 6, wherein the radiator and the condenser are fixed to one another by fixing pads.

12. A cooling apparatus comprising a first heat exchanger and a second heat exchanger, the two heat exchangers being disposed such that each has at least a portion in face-to-face relationship with the other, the apparatus having a fan, a ring member circumferentially enclosing the periphery of the fan, the ring member being secured to at least one of the two heat exchangers and the fan being disposed between the facing portions of the heat exchangers, a hub portion, a first plurality of blades for the fan supported by the hub portion, said first plurality of blades, each of said blades in said first plurality extending from said hub portion radially outward extensions, and a second plurality of second blades each having a respective end and extending radially outwardly from the first circumferential support member, and a second circumferentially-extending second blade support member joining the ends of said second blades.

13. A cooling apparatus as claimed in claim 12, wherein the first heat exchanger is a radiator and the second heat exchanger is a condenser.

14. A cooling apparatus as claimed in claim 12, wherein the apparatus further comprising a fan drive motor for driving the fan, and the fan drive motor is directly mounted on one of the first and second heat exchangers.

15. A cooling apparatus as claimed in claim 12, wherein the first and second heat exchanger are secured to one another.

16. A cooling apparatus as claimed in claim 12, wherein an auxiliary fan is disposed on the outer face portion of one of the first and second heat exchangers.

17. A cooling apparatus as claimed in claim 12, further comprising an electric motor rotating the fan, the electric motor having a shaft member, one of the heat exchangers defining a passageway for the shaft member and the shaft member extending to the space between the two heat exchangers whereby the fan is secured to the shaft member.

18. A cooling apparatus as claimed in claim 17, wherein said electric motor is a brushless d.c. motor.

19. A cooling apparatus as claimed in claim 18, wherein the brushless dc motor has a rotor portion integral with the hub portion of the fan.

20. A cooling apparatus as claimed in claim 18, wherein the brushless dc motor comprises electronic commutating circuitry.

21. A cooling apparatus as claimed in claim 20, wherein said commutating circuitry is disposed in the incoming air flow to an associated heat exchanger.

22. A cooling apparatus comprising a first heat exchanger and a second heat exchanger, the two heat exchanger being disposed such that each has at least a portion in face-to-face relationship with the other, the arrangement further having a plurality of fans and a corresponding plurality of ring members, each ring member circumferentially enclosing the periphery of a respective one of the fans, the ring members being secured to at least one of the two heat exchangers and the fans being disposed between facing portions to the heat exchangers, a hub for at least one of said fans, a first plurality of blades for the at least one fan supported by the hub, said first plurality of blades extending from said hub radially outwardly, a first circumferentially-extending blade support member for joining together the outward extension of said first plurality blades, and a second plurality of second blades each having a respective end and extending radially outwardly from the first circumferential support member, and a second circumferentially-extending second blade support member joining together the ends of said second blades.

23. A cooling apparatus as claimed in claim 22, wherein the first heat exchanger is a radiator and the second heat exchanger is a condenser.

24. A cooling apparatus as claimed in claim 22, further comprising a fan drive motor for driving at least one of the fans in said plurality of fans, and the fan drive motor is directly mounted on one of the first and second heat exchangers.

25. A cooling apparatus as claimed in claim 22, wherein the first and second heat exchanger are secured to one another.

26. A cooling apparatus as claimed in claim 22, wherein an auxiliary fan is disposed on the outer face portion of one of the first and second heat exchangers.

27. A cooling apparatus as claimed in claim 22, wherein the apparatus further comprises and electric motor rotating at least one of the fans in said plurality of fans, the electric motor having a shaft member, one of the heat exchangers defining a passageway for the shaft member and the shaft member extending to the space between the two heat exchangers whereby the at least one fan is secured to the shaft member.

28. A cooling apparatus as claimed in claim 27, wherein electric motor is a brushless d.c. motor.

29. A cooling apparatus as claimed in claim 28, further comprising a hub portion for at least one fan in the plurality thereof, wherein the brushless dc has a rotor portion integral with the hub portion of the at least one fan.

30. A cooling apparatus as claimed in claim 28, wherein brushless dc motor comprises electronic commutating circuitry.

31. A cooling apparatus as claimed in claim 30 wherein said commutating circuitry is disposed in the incoming air flow to an associated heat exchanger.

* * * * *

UNITED STATES PATENT AND TRADEMARK OFFICE
CERTIFICATE OF CORRECTION

PATENT NO. : 5,771,961

DATED : June 30, 1998

INVENTOR(S) : Ahmad Alizadeh

It is certified that error appears in the above-identified patent and that said Letters Patent is hereby corrected as shown below:

Claim 12, line 11, after the words "hub portion radially outward," insert -- a first circumferentially-extending blade support member for joining together said first plurality of blade outward --.

Signed and Sealed this

Sixteenth Day of March, 1999

Attest:

Q. TODD DICKINSON

*Attesting Officer*   *Acting Commissioner of Patents and Trademarks*